United States Patent [19]

Rohloff

[11] Patent Number: 4,957,621
[45] Date of Patent: Sep. 18, 1990

[54] BAFFLE PLATE FOR WATER PURIFICATION RESERVOIR

[75] Inventor: Pete Rohloff, Riverton, Kans.

[73] Assignee: Ingersoll-Rand Company, Woodcliff Lake, N.J.

[21] Appl. No.: 383,002

[22] Filed: Jul. 21, 1989

[51] Int. Cl.$^5$ ............................................. B01D 21/02
[52] U.S. Cl. ................................... 210/171; 210/232; 210/244; 210/251; 210/521; 210/532.1; 83/53; 83/177
[58] Field of Search ............... 210/171, 172, 232, 244, 210/251, 521, 532.1, 542; 83/53, 177

[56] References Cited

U.S. PATENT DOCUMENTS

| | | | |
|---|---|---|---|
| 769,584 | 9/1904 | Barber et al. | 210/532.1 |
| 864,158 | 8/1907 | DeLang | 210/532.1 |
| 2,467,547 | 4/1949 | Birmbaum | 210/532.1 |
| 2,472,322 | 6/1949 | Weissman | 210/532.1 |
| 2,985,050 | 5/1961 | Schwacha | 83/53 |
| 4,268,392 | 5/1987 | Hayes | 210/532.1 |
| 4,338,195 | 7/1982 | Treyssac | 210/521 |
| 4,872,975 | 10/1989 | Benson | 210/171 |

FOREIGN PATENT DOCUMENTS 75840 7/1947 Czechoslovakia .
682745 6/1930 France .

Primary Examiner—Richard V. Fisher
Assistant Examiner—Christopher Upton
Attorney, Agent, or Firm—G. B. Foster

[57] ABSTRACT

In a waterjet cutting system utilizing abrasives added to the cutting liquid, a liquid purifier is provided to remove the abrasives from the liquid before the liquid is disposed of including a disposable reservoir with a removable end plate sealingly engaged with the end of the reservoir. A baffle plate is rigidly connected to the end plate such that when the end plate is in position, the baffle plate will divide the interior of the reservoir into two compartments. An inlet nozzle is attached to the end plate to feed the liquid into one of the compartments on one side of the baffle plate, and an outlet nozzle is attached to the end plate on the other side of the baffle plate, such that the liquid must change directions when it travels from the inlet to the outlet nozzle to assist in the separation process.

14 Claims, 2 Drawing Sheets

BAFFLE PLATE FOR WATER PURIFICATION RESERVOIR

BACKGROUND OF THE INVENTION

This invention relates generally to liquid purification devices, and more specifically to a liquid purifier separating a mineral abrasive from a liquid used in waterjet cutting operations.

In waterjet cutter technology, in which a narrow stream of liquid is shot at the workpiece at a supersonic speed to cut the workpiece, an abrasive material such as garnet is frequently added to the cutting liquid to assist in the cutting process. The concentration of garnet in the liquid must be greatly reduced before the liquid can be discarded.

Traditional methods of garnet removal in this application includes multi-compartmentalized liquid separators with baffles interspaced between the compartments. Since the liquid in these liquid purifiers travels in only one axial direction, the separation process is somewhat ineffective. Also, when these separators become filled with the impurity, the purifiers must be disengaged and manually emptied. This process requires considerable time and effort.

The foregoing illustrates limitations known to exist in present devices. Thus, it is apparent that it would be advantageous to provide an alternative directed to overcoming one or more of the limitations set forth above. Accordingly, a suitable alternative is provide including features more fully disclosed hereinafter.

SUMMARY OF THE INVENTION

In one aspect of the invention, this is accomplished by providing a reservoir including an end wall with a baffle plate attached to the endwall and extending into the interior of the reservoir thus dividing the reservoir into two compartments. An input nozzle admits the liquid with impurities into one of the compartments while an output nozzle drains the liquid from the other compartment. There is at least one flow path between the input and the output.

The foregoing and other aspects will become apparent from the following detailed description of the invention when considered in conjunction with the accompanying drawing figures. It is to be expressly understood, however, that the drawing figures are not intended as a definition of the invention but are for the purposes of illustration only.

BRIEF DESCRIPTION OF THE DRAWING FIGURES

DETAILED DESCRIPTION

Figure 1:
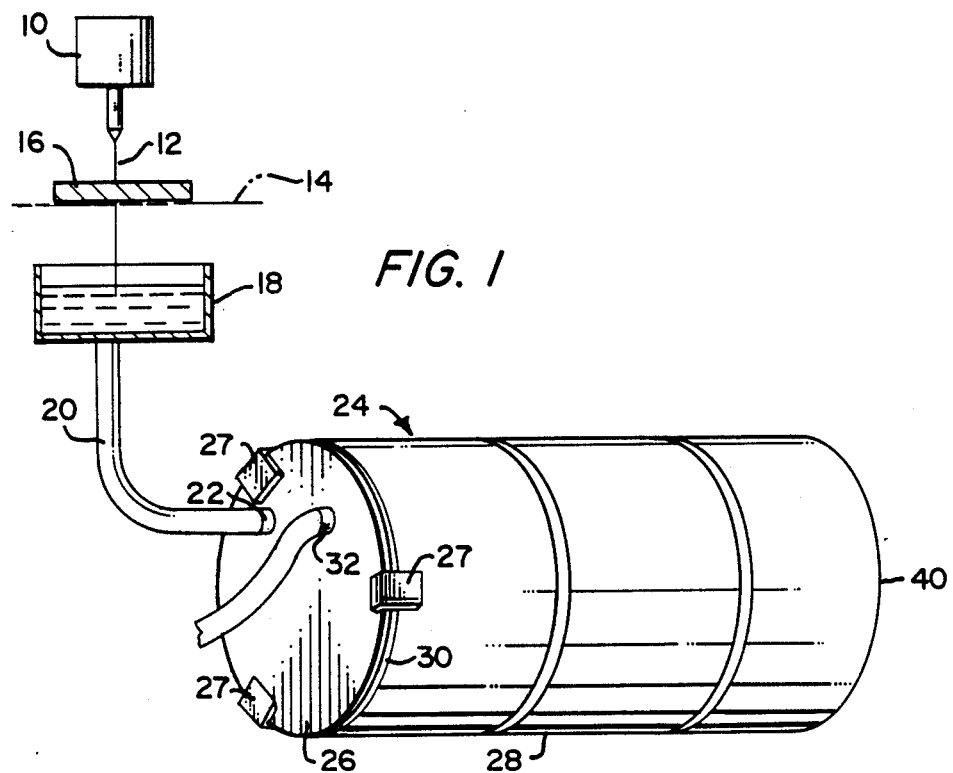
FIG. 1 is a perspective view illustrating an embodiment of the liquid purifying reservoir of the present invention along with the operating waterjet cutter and the connecting hoses.

Referring now to the drawings, FIG. 1 shows a waterjet cutter 10 which shoots a supersonic stream of cutting liquid 12, usually water, at a workpiece support 14. Either the cutter 10 or the support 14 can be moved to produce a cut in a workpiece 16, as is well known in the art. A receiver 18 is positioned to receive the liquid from the waterjet cutter. Abrasives, such as garnet, are often added to the liquid to assist in the cutting process.

An inlet hose 20 drains the cutting liquid which has collected in the collector through an input nozzle 22 into a purifying reservoir 24. The reservoir 24 comprises a cylindrical disposable drum or steel barrel can 28, and a removable circular end plate 26 which are connected to each other with clamps 27 and with a sealing gasket 30 providing a seal.

The inlet nozzle 22 extends through end plate 26 adjacent to an outlet nozzle 32. The nozzles 22, 32 are provided off-center of the end plate 26 and are therefore adjacent one side thereof. An outlet hose 34 is connected to outlet nozzle 32 to drain substantially purified liquid from the reservoir 24, which may now be disposed of. During operation of the purification system, the water level in the reservoir will be kept at the level of the output nozzle.

Mounted to the end plate 26 between the input and output nozzles is a baffle plate 36 which causes the liquid purification to occur. In order for liquid to pass from the input to the output nozzle, it must pass around, or through the baffle plate 36. During the liquids passage from the inlet to the outlet nozzle, the flow of liquid must change direction at a substantial angle. This directional change accounts for a remarkable amount of purification.

Figure 2:
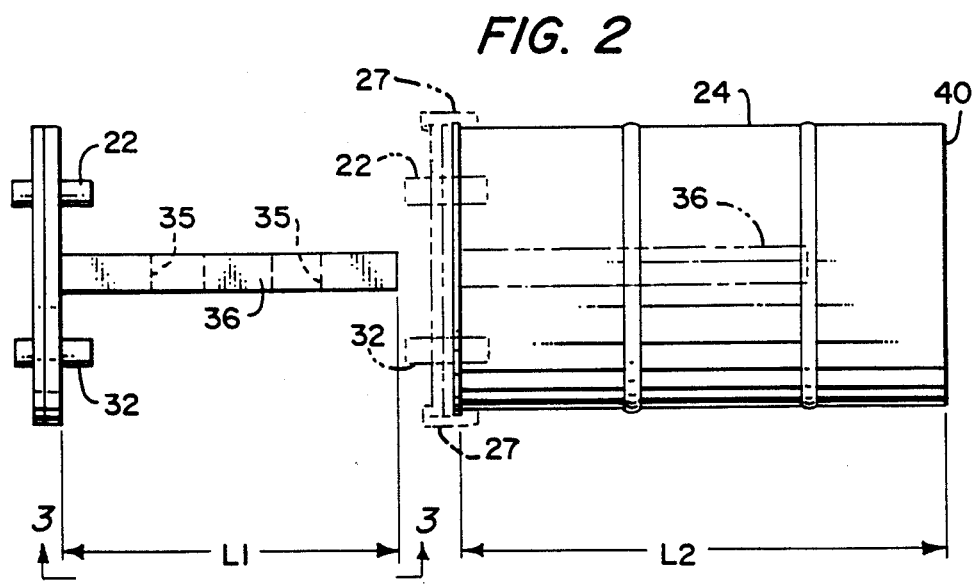
FIG. 2 is a top view illustrating an embodiment of the reservoir of FIG. 1, with the combined end plate and baffle plate shown in solid in a removed position, and shown in phantom in an inserted position.
Figure 3:
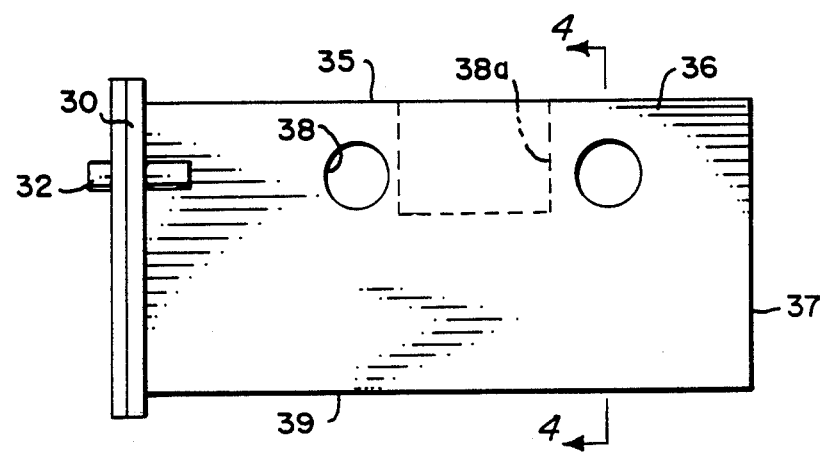
FIG. 3 is a side view illustrating an embodiment of the combined end and baffle plates taken along line 3—3 of FIG. 2.
Figure 4:
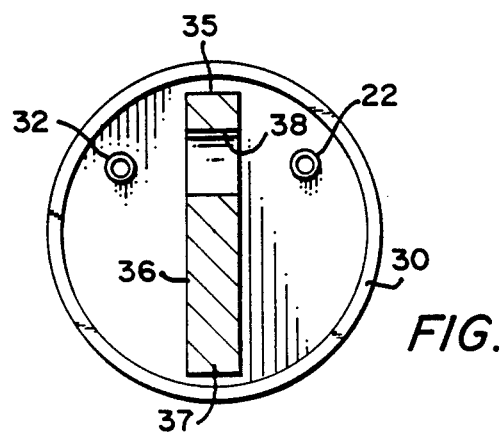
FIG. 4 is an end view illustrating an embodiment of the combined end and baffle plate as taken along line 4—4 of FIG. 3.

The majority of liquid passing through the reservoir 24 travels between an end 37 of the baffle plate 36 and a closed end wall 40 of the reservoir 24 since the baffle plate 36 has a length L1 which is less than the length L2 of the disposable drum 28 (see FIG. 2). The remaining fluid passes through a plurality of apertures 38 provided at a level slightly below nozzles 22, 32, the apertures are formed adjacent an upper surface 35 of the baffle plate 36. Since these apertures 38 are near the upper level of the liquid in the reservoir 24, the liquid which passes through the apertures 38 is relatively free from impurities. It is worth noting that whether the liquid in the reservoir passes through the aperture or around the end of the baffle plate, it must change direction reaching a point of zero velocity, thereby greatly enhancing separation of the garnet or other impurity from the liquid. As an alternative to apertures 38, a groove or recess 38a may be provided to extend downward from surface 35 to permit the fluid to pass therethrough.

The separated garnet impurities settle to the bottom of the reservoir 24 adjacent an edge 39 of baffle plate 36. This system properly functions until the level of the sediments are near the vertical height of the nozzles 22, 32. When the reservoir 24 is filled, the drum 28 portion of the reservoir is simply disconnected, capped, rolled away and a new drum clamped to the end plate 26. This eliminates the mess and labor required to manually empty out the compartmentalized cylinders presently being used.

This system may be recirculatory if the liquid exiting outlet hose 34 supplies waterjet cutter 10. Under these circumstances, it is extremely important to prevent water or air leaks which would diminish the amount of liquid in the system. Sealing drum 28 with the use of gasket 30 is much easier than sealing most baffled reservoirs which are currently used, since drum 28 is designed to be a sealed container.

While this invention has been illustrated and described in accordance with a preferred embodiment, it is recognized that other variations and changes may be made therein without departing from the invention as set forth in the claims.

What is claimed is:

1. A liquid purifier reservoir for separating impurities from a liquid comprising:
   a removable substantially vertical planar endwall attached to the reservoir;
   a substantially vertical baffle plate attached to and extending perpendicular to said removable endwall into an interior portion of said reservoir, dividing said reservoir into first and second compartments;
   input means, mounted on a first face of the endwall, for feeding the liquid into said first compartment;
   output means, mounted on said first face of the endwall, for draining the liquid from said second compartment; and
   means for providing a plurality of paths for the liquid to travel between the two compartments, wherein the liquid travels in a first direction while in said first compartment, and a second direction while in said second compartment, said first and second directions being substantially opposite to each other.

2. A liquid purifier as defined in claim 1, wherein said reservoir is a disposable container.

3. A liquid purifier as defined in claim 2, wherein said disposable container is cylindrical.

4. A liquid purifier as defined in claim 1, wherein the means for providing a plurality of paths between the compartments includes apertures formed in said plate.

5. A liquid purifier as defined in claim 4, wherein said apertures are formed near a surface opposite a direction which the impurities settle of said baffle plate.

6. A liquid purifier as defined in claim 1, further comprising:
   a closed endwall, wherein the means for providing a plurality of paths between the compartments includes a vertical edge of said baffle plate spaced from the closed endwall of said reservoir.

7. A liquid purifier as defined in claim 1, wherein said reservoir has a total volume which is in excess of 20 gallons.

8. A liquid purifier reservoir for separating impurities from a liquid comprising:
   a substantially vertical planar removable endwall attached to the reservoir;
   a substantially vertical baffle plate attached to and extending perpendicular to said removable endwall into the interior of said reservoir;
   an input nozzle, mounted on a first face of, the removable endwall, extending into said reservoir on one side of said baffle plate;
   an output nozzle, mounted on said first face of, the removable endwall extending into said reservoir on another side of the baffle plate; and
   means for providing a plurality of paths for the liquid to travel from the one side of the baffle plate to the other side of the baffle plate, wherein the liquid travels in a first direction while in said one side of the baffle plate, and in a second direction while in said other side of the baffle plate, the first direction and the second direction are substantially opposite to each other.

9. A liquid purifier as defined in claim 8, wherein said reservoir is a disposable container.

10. A liquid purifier as defined in claim 8, wherein said reservoir is a drum.

11. A liquid purifier as defined in claim 8, wherein the means for providing a plurality of paths includes apertures formed in said baffle plate.

12. A waterjet liquid purification system comprising;
    a waterjet cutter in which liquid containing impurities is accelerated to assist in cutting a workpiece;
    a purifying reservoir for collecting water used in the waterjet cutter;
    a substantially vertical planar end plate which sealingly and removably engages with the reservoir;
    a substantially vertical baffle plate affixed to said end plate which, when the end plate is in sealing engagement with the reservoir; separates the reservoir into first and second compartments; inlet means, mounted on a first face of the endwall, for permitting liquid from the receiver to enter the first compartment;
    outlet means, mounted on said first face of the endwalls, for permitting the liquid to drain from the second compartment; and
    means for providing a plurality of paths for the liquid to travel between the compartments, wherein the liquid travels in a first direction while in said first compartment, and a second direction while in said second compartment, said first and second faces being substantially opposed to each other.

13. A waterjet liquid purification system as defined in claim 12, wherein the reservoir is a disposable container.

14. A waterjet liquid purification system as in claim 13, wherein the disposable container is a drum.

* * * * *